2,914,498

AQUEOUS DISPERSION OF VINYL CHLORIDE POLYMER CONTAINING SUBSTITUTED POLYACRYLAMIDE

Richard W. Quarles and William H. McKnight, Pittsburgh, Pa., assignors to Union Carbide Corporation, a corporation of New York No Drawing. Application November 30, 1953
Serial No. 395,277

7 Claims. (Cl. 260—29.6)

This invention relates to water soluble thickening agents for water dispersed synthetic resin compositions. More particularly the invention relates to the use of certain polyacrylamides as such thickening agents.

Vinyl resins including the vinyl chloride polymers and copolymers with vinyl acetate, vinylidene chloride or acrylonitrile have wide industrial uses for coating textiles and paper and for preparing films either by casting or dipping. Highly plasticized compositions may be handled in paste form, but compositions low in plasticizer must be dissolved in solvents or dispersed as organosols in non-solvents to attain the fluidity required for application. The flammability of these compositions limits their usefulness. It would be desirable to substitute water as the dispersing medium, particularly since these resin polymers may be manufactured as latices. To attain adequate stability for shipment, storage and coating, however, such latices require the addition of a water soluble thickener. Conventional thickeners used in aqueous dispersions are starch, gum arabic, casein, polyvinyl alcohol, polyacrylic acid, carboxymethyl cellulose, hydroxy ethyl cellulose and the like. None of these form a homogeneous film with vinyl chloride polymers and copolymers. As a result of this incompatibility the film is degraded in physical properties and the resistance to water is decreased because of the water soluble materials in the film. This has limited the use of aqueous dispersions of vinyl polymers as coating compositions.

It is an object of this invention to provide water soluble thickening agents suitable for controlling the viscosity and the spreading and penetrating properties of the resins mentioned above when these resins are dispersed in water for use as coating composition or as compositions for dipping and casting. It is a further object of the invention to provide such thickening agents which will also promote the cohesive properties of films of these resins during drying and thereby afford more latitude in the drying and baking schedules during film formation. Yet another object of the invention is to provide water soluble thickening agents which will be compatible with the water-dispersed phase of the resin so as to permit preparation of a homogeneous film.

We have now found that those water soluble polymers belonging to the class of compounds described as polyacrylamides are particularly suitable for use as thickeners in aqueous dispersions of vinyl polymers. These polyacrylamides we have found are readily compatible with the aforementioned vinyl polymers. Moreover, they retain this compatibility in both the air dried and baked film. Consequently, the films deposited from compositions containing this novel thickener are homogeneous and coherent and fuse to clear films when baked. Moreover, such coatings have been found to be more moisture resistant than films deposited from compositions using the conventional water soluble thickening agents. This may be due to the fact that these polyacrylamides undergo further polymerization during the baking of the coating thus rendering them less water soluble, or they may be protected by being dissolved in the water resistant vinyl resin. The exact mechanism of their beneficial effect has not been fully established.

We have also found that by the use of these polyacrylamides the viscosity of aqueous compositions of vinyl polymers can be readily controlled, thereby regulating their stability for shipment and storage or their spreading and penetrative properties when used for coating paper, textiles, or as casting or dipping compositions.

The polyacrylamides which we have found particularly suitable are the poly N,N, alkyl substituted acrylamides. These compounds are polymers of compounds having the general structure:

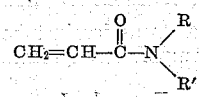

where R or R' can be an alkyl radical of one to three carbon atoms. They include the dimethyl, diethyl, dipropyl and methylethyl compounds. These N,N alkyl acrylamides can be prepared by an exchange reaction between an alkyl secondary amine and an acrylate ester, according to the following equation:

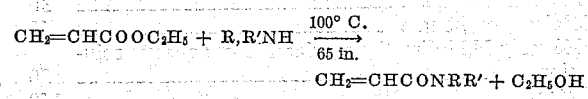

Polymerization may be carried out in water solution at temperatures of about 30° C. using a catalyst such as potassium persulfate. Aqueous polymer concentrations of 7.5–10 percent are preferably employed having a viscosity of about 20,000–50,000 c.p.s. Brookfield viscosity at 6 r.p.m.

The resins used in our compositions are principally vinyl resins, such as polyvinyl chloride, polyvinyl acetate or the copolymers containing from 85 to 100 percent polymerized vinyl chloride and from 15 to 0 percent of copolymerized vinyl acetate. Aqueous dispersions of these resins may be prepared in a number of ways. For example, the vinyl monomers may be polymerized directly in water suspension using appropriate polymerization catalysts. The polyacrylamide thickener may be added to stabilize these latices either during production or added after the vinyl polymer has been formed. Or the vinyl latex may be spray dried and subsequently redispersed in water. The polyacrylamide thickener has been found useful in the process of redispersing the vinyl polymer as well as thickening the dispersion prepared without it. Another way to prepare the aqueous dispersion of the vinyl polymer is to disperse the vinyl resin in a solvent along with a suitable emulsifying agent such as an alkyl aryl polyether alcohol and then slowly add water with good agitation in an amount sufficient to give a latex of the desired consistency.

The polyacrylamide thickener has been advantageously employed with other latices such as the latex of a conjoint polymer of vinyl chloride and vinylidene chloride, or with mixtures of polyvinyl chloride latex and butadiene-acrylonitrile polymer latex.

The composition may include emulsion stabilizers, plasticizers, pigments and fillers if desired.

The amount of thickener to be used in the composition is minor and will depend to some extent on the consistency of the latex and on the concentration and consistency of the thickener. Generally speaking 0.5 to 3 parts of thickener by dry weight are used for each 100 parts of resin dispersed in the water depending upon the viscosity required.

Formulations containing these polyacrylamides as thickeners can be used for a variety of purposes. Used for cloth coatings they impart to the cloth a smooth surface and an excellent soft "hand." They adhere well and have good moisture resistance. They may be applied directly to the cloth or over a priming coat. They also may be used for the preparation of emulsions having a high percentage of lacquer phase. Such emulsions are relatively more stable on storage than emulsions prepared without the polyacrylamides. These novel formulations are also useful in the preparation of dipping hydrosols for the manufacture of dipped goods such as gloves. When used for cloth coating they can be applied on the conventional cloth coaters and then baked at temperatures of 325°–350° F. Used as a dipped coating they usually require a prebake at lower temperatures of about 200° F. and then a final bake at 350° F. The formulations may be used for the preparation of cloth laminates. When so used there is no penetration of the resin to the outer cloth and a strong laminar bond is formed.

The following examples are typical of the invention.

Example I

|  | Parts by weight |
|---|---|
| Vinyl resin (vinyl chloride (97%)–vinyl acetate (3% copolymer) | 200 |
| Plasticizer (di 2-ethylhexyl phthalate) | 130 |
| Emulsifier (alkyl aryl polyether alcohol) | 2 |
| Stabilizer (glycidyl ether of bisphenol A) | 4 |
| Titanium dioxide | 30 |
| Calcium carbonate | 60 |
| 10% poly N,N dimethylacrylamide in aqueous solution | 50 |
| Water | 160 |

The vinyl resin, plasticizer, emulsifier, stabilizer, pigments and filler were milled together for about one-half hour to give a somewhat damp powder mix. The acrylamide thickener and water were added to form a thick paste which was passed through a 3 roll paint mill to give a composition of smooth texture and good cohesiveness. This compositions was coated onto cloth using a conventional doctor blade cloth coater and gave a smooth even film which, when baked at temperatures of about 325° to 350° F. for from 3 to 5 minutes, was smooth and tough and adhered well to the cloth.

Example II

|  | Parts by weight |
|---|---|
| Vinyl resin (vinyl chloride (97%) vinyl acetate (3%) copolymer) | 37.0 |
| Plasticizer (di 2-ethyl hexyl phthalate) | 18.0 |
| Water | 45.0 |
| 10% poly N,N dimethyl acrylamide in aqueous solution | 1.8 |

The vinyl resin and plasticizer were milled together to give a somewhat damp mix and then the water and acrylamide added and mixed to a smooth paste which was passed through a 3 roll paint mill. The resulting composition gave clear, homogenous, tough films when baked at temperatures of 300° to 350° F. on glass or aluminum. This experiment illustrates the good compatibility of the thickener with the vinyl resin, since both the air dried film and baked film were clear.

Example III

|  | Parts by weight |
|---|---|
| Vinyl chloride-vinylidene chloride copolymer latex (50% resin content–70% vinyl chloride) | 100 |
| Poly N,N dimethyl acrylamide aqueous solution (6% resin content) | 15 |

The above components were mixed to give a stable latex which when used to coat a glass plate gave a good clear film when baked at 350° F. for three minutes.

Example IV

|  | Parts by weight |
|---|---|
| Vinyl resin (vinyl chloride (97%) vinyl acetate (3%) copolymer) | 15 |
| Plasticizer (di 2-ethyl hexyl phthalate) | 52 |
| Titanium dioxide | 15 |
| Antimony trioxide | 1.7 |
| Methyl isobutyl ketone-toluene (50/50 ratio) | 63.1 |
| Water | 96 |
| Wetting agent (dioctyl sodium sulfo succinate) | 2 |
| Poly N,N dimethyl acryl amide | 2 |

The vinyl resin was dissolved in the ketone-toluene mixture, the plasticizer and pigments added and then the whole was slowly added with good agitation to the water, wetting agent, and polyacrylamide. A stable oil in water emulsion was formed at 63% lacquer phase and with 37% water phase which was stable on storage. When the above procedure was followed except for omitting the polyacrylamide, an emulsion did not form until the water phase was 54% and then it was not as stable as the emulsion containing the polyacrylamide.

Example V

|  | Parts by Weight ||||| 
|---|---|---|---|---|---|
|  | A | B | C | D | E |
| Vinyl Resin (Polyvinyl chloride) | 100 | 100 | 100 | 100 | 100 |
| Plasticizer (Di 2-ethyl hexyl phthalate) | 65 | 65 | 65 | 65 | 65 |
| Filler (Calcium carbonate) | 30 | 30 | 30 | 30 | 30 |
| Pigment (Titanium oxide) | 15 | 15 | 15 | 15 | 15 |
| Emulsifier (Alkyl-aryl polyether alcohol) | 1 | 1 | 1 | 1 | 1 |
| Stabilizer (Glycidyl ether of Bisphenol A) | 2 | 2 | 2 | 2 | 2 |
| Poly, N,N dimethyl acryl amide 6.0% aqueous solution | 13.3 | 26.6 | 39.9 |  |  |
| Poly, N,N dimethyl acryl amide 7.5% aqueous solution |  |  |  | 33.2 | 49.8 |
| Water | 100.7 | 87.4 | 74.1 | 81.8 | 64.2 |
| Percent Dry Poly N,N dimethyl acrylamide based on resin | 1 | 2 | 3 | 2 | 3 |

The above formulations were prepared similar to that described in Example I. All coated well on the conventional doctor blade coater and gave a smooth, tough film when baked at temperatures of 325°–350° F. for from 3 to 5 minutes. Samples exposed in the humidity box at a relative humidity of 100 percent for 24 hours showed good adhesion.

Example VI

This experiment compares the formulation using polyacrylamides as a thickening agent in combination with other conventional thickening agents.

|  | Parts by Weight ||||
|---|---|---|---|---|
|  | A | B | C | D |
| Vinyl Resin (Polyvinyl chloride) | 200 | 200 | 200 | 200 |
| Plasticizer (Di-2-ethyl phthalate) | 130 | 130 | 130 | 130 |
| Filler (Calcium carbonate) | 60 | 60 | 60 | 60 |
| Pigment (Titanium dioxide) | 30 | 30 | 30 | 30 |
| Emulsifier (Alkyl aryl polyether alcohol) | 2 | 2 | 2 | 2 |
| Stabilizer (Glycidyl ether of Bisphenol A) | 4 | 4 | 4 | 4 |
| Poly N,N dimethyl acrylamide 7.5% concentration aqueous solution | 53.4 | 26.7 | 26.7 | 26.7 |
| Carboxy methyl cellulose 3% concentration aqueous solution |  | 66.7 |  |  |
| Acrylic copolymer 15% concentration aqueous solution |  |  | 13.4 |  |
| Hydroxy ethyl cellulose |  |  |  | 2.0 |
| Water | 174.8 | 34.6 | 87.9 | 99.3 |
| Percent Thickener (dry) based on resin | 2 | 2 | 2 | 2 |

All of these coating formulations were prepared according to the directions of Example I and all gave smooth pastes. All were applied to cloth on a conventional cloth coater.

Coating A spread well and gave a smooth film. Coating B spread well and gave a smooth film with good hardness. Coating C spread about as well as B but film was not as smooth. Coating D was borderline in coating properties.

The coated cloth was baked for 3½ minutes at 350° F. Coating A gave good adhesion and tough film. Coating B gave poor adhesion and poor toughness. Coating C gave fair adhesion and good toughness. Coating D gave poor adhesion and poor toughness.

All of these cloths were soaked overnight in water. The cloth coated with Coating A showed the best retention of adhesion and toughness.

These tests showed that the coating on the cloth with the formulation containing only poly N,N dimethyl acryl amide was superior in adhesion, toughness and moisture resistance.

*Example VII*

A comparison of coating formulations containing poly N,N dimethyl acrylamide as thickener and one containing sodium carboxy methyl cellulose as thickener was made with the following results. The formulations were prepared as described in Example I and contained the following.

|  | Parts by Weight | |
| --- | --- | --- |
|  | A | B |
| Vinyl Resin | 200 | 200 |
| Plasticizer | 130 | 130 |
| Filler | 60 | 60 |
| Pigment | 30 | 30 |
| Stabilizer | 4 | 4 |
| Emulsifier | 2 | 2 |
| Carboxy methyl cellulose (solid) | 2 |  |
| Poly N,N dimethyl acrylamide 5% concentration aqueous solution |  | 120 |
| Water | 230 | 110 |

The two samples were identical in coating properties except for a slight water separation with the carboxy methyl cellulose.

Formulation A resulted in a stiff cheesy film when baked at 350° F. for 2½ minutes whereas formulation B fused to a soft pliable continuous coating when baked under identical conditions.

Adhesion of formulation A was degraded upon pressing in a hydraulic press, whereas with formulation B the adhesion to the cloth improved when pressed under the same conditions.

*Example VIII*

This is an example of a dipping formulation prepared by using poly N,N dimethyl acrylamide as a thickener.

Parts by weight
Vinyl resin (vinyl chloride (97)–vinyl acetate (3%) copolymer) _____ 33.9
Plasticizer (di-2-ethyl hexyl phthalate) _____ 17.0
Mineral wax _____ 0.3
Stabilizer (phosphated castor oil) _____ 0.3
Poly N,N dimethyl acrylamide (dry) _____ 0.3
Water _____ 48.2

The vinyl resin was tumbled in a pebble mill with the plasticizer-wax solution for one-half hour, then the water added and tumbling continued for 22 hours. The polyacrylamide was added and tumbling continued for another two hours. When the tumbling was completed the stabilizer was stirred in. Glove forms were dipped in this formulation and prebaked for half an hour at 200° F., then given a final bake of seven minutes at 350° F. A good dipped article was obtained.

*Example IX*

This example illustrates a formulation which can be applied to a textile material for the purpose of making a laminate.

Parts by weight
Vinyl resin _____ 22.7
Plasticizer _____ 9.0
Poly N,N dimethyl acrylamide 6% concentration aqueous solution _____ 3.8
Mineral wax _____ 0.2
Water _____ 64.3

This formulations was prepared as described in Example I and then coated on one side of a piece of light cloth known as "scrim" and one side of a piece of gabardine cloth. A piece of burlap was coated on both sides. The coated pieces were then baked two minutes at 200° F. These coated samples were then heat sealed with a hot iron at 250–270° C. When the scrim and burlap were separately heat-sealed between two layers of the gabardine cloth, a stiffened laminate was formed in each case, with no penetration of the resin to the outer cloth surface. The laminar bonds were strong.

What is claimed is:

1. A resinous film-forming composition comprising an aqueous dispersion of a vinyl chloride polymer selected from the group consisting of polyvinyl chloride, copolymers of vinyl chloride and vinyl acetate containing at least 85% by weight of vinyl chloride polymerized therein, and copolymers of vinyl chloride and vinylidene chloride containing a predominant amount of vinyl chloride polymerized therein, and, per 100 parts by weight of said vinyl polymer, up to 3 parts by dry weight of a water soluble polymer of an N,N dialkyl-substituted acrylamide having the structure:

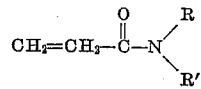

wherein R and R' each represent an alkyl group having up to three carbon atoms, said composition being characterized by the ability to form a homogeneous single phase dry film.

2. A resinous film-forming composition comprising an aqueous dispersion of a vinyl chloride polymer selected from the group consisting of polyvinyl chloride, copolymers of vinyl chloride and vinyl acetate containing at least 85% by weight of vinyl chloride polymerized therein, and copolymers of vinyl chloride and vinylidene chloride containing a predominant amount of vinyl chloride polymerized therein, and, per 100 parts by weight of said vinyl polymer, from 0.5 to 3 parts by dry weight of a water soluble polymer of an N,N dialkyl-substituted acrylamide having the structure:

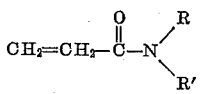

wherein R and R' each represent an alkyl group having up to three carbon atoms, said composition being characterized by the ability to form a homogeneous single phase dry film.

3. A resinous film-forming composition comprising an aqueous dispersion of a vinyl-chloride-vinylidene chloride copolymer containing a predominant amount of vinyl chloride polymerized therein and, per 100 parts by weight of said copolymer, up to 3 parts by dry weight of a water soluble polymer of an N,N dialkyl-substituted acrylamide having the structure:

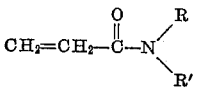

wherein R and R' each represent an alkyl group having up to three carbon atoms, said composition being characterized by the ability to form a homogeneous single phase dry film.

4. A resinous film-forming composition comprising an aqueous dispersion of a vinyl chloride-vinyl acetate copolymer containing at least 85% by weight of vinyl chloride polymerized therein and, per 100 parts by weight of said copolymer, up to 3 parts by dry weight of a water soluble polymer of an N,N dialkyl-substituted acrylamide having the structure:

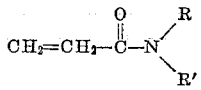

wherein R and R' each represent an alkyl group having up to three carbon atoms, said composition being characterized by the ability to form a homogeneous single phase dry film.

5. A resinous film-forming composition comprising an aqueous dispersion of a vinyl chloride polymer selected from the group consisting of polyvinyl chloride, copolymers of vinyl chloride and vinyl acetate containing at least 85% by weight of vinyl chloride polymerized therein, and copolymers of vinyl chloride and vinylidene chloride containing a predominant amount of vinyl chloride polymerized therein, and, per 100 parts by weight of said vinyl chloride polymer up to 3 parts by dry weight of poly N,N dimethyl acrylamide, said composition being characterized by the ability to form a homogeneous single phase dry film.

6. A resinous film-forming composition comprising an aqueous dispersion of a vinyl chloride-vinylidene chloride copolymer containing a predominant amount of vinyl chloride polymerized therein, and, per 100 parts by weight of said copolymer, up to 3 parts by dry weight of poly N,N dimethyl acrylamide, said composition being characterized by the ability to form a homogeneous single phase dry film.

7. A resinous film-forming composition comprising an aqueous dispersion of a vinyl chloride-vinyl acetate copolymer containing at least 85% by weight of vinyl chloride polymerized therein, and, per 100 parts by weight of said copolymer, up to 3 parts by dry weight of poly N,N dimethyl acrylamide, said composition being characterized by the ability to form a homogeneous single phase dry film.

References Cited in the file of this patent

UNITED STATES PATENTS

| | | |
|---|---|---|
| 1,976,679 | Fikentscher et al. | Oct. 9, 1934 |
| 2,123,599 | Finkentscher et al. | July 12, 1938 |
| 2,311,548 | Jacobson et al. | Feb. 16, 1943 |
| 2,598,663 | Kropa | June 3, 1952 |
| 2,620,324 | Coover et al. | Dec. 2, 1952 |
| 2,632,704 | Lowe et al. | Mar. 24, 1953 |

OTHER REFERENCES

Rinse: "Paint Technology," February 1952, pages 56–58, volume 17, No. 194.

Parker: "Official Digest", October 1952, pages 700–709.